US008857911B2

(12) United States Patent
Aguirre et al.

(10) Patent No.: US 8,857,911 B2
(45) Date of Patent: Oct. 14, 2014

(54) PASSENGER SEAT ASSEMBLY

(75) Inventors: Raul Daniel Flores Aguirre, Chihuahua (MX); Oscar Ruiz Lara, Chihuahua (MX)

(73) Assignee: Zodiac Seats US LLC, Gainesville, TX (US)

( * ) Notice: Subject to any disclaimer, the term of this patent is extended or adjusted under 35 U.S.C. 154(b) by 142 days.

(21) Appl. No.: 13/493,010

(22) Filed: Jun. 11, 2012

(65) Prior Publication Data

US 2012/0313403 A1    Dec. 13, 2012

Related U.S. Application Data

(60) Provisional application No. 61/520,538, filed on Jun. 10, 2011, provisional application No. 61/501,885, filed on Jun. 28, 2011.

(51) Int. Cl.
*A47C 1/12*   (2006.01)
*B64D 11/00*  (2006.01)
*B64D 11/06*  (2006.01)

(52) U.S. Cl.
CPC .... B64D 11/0015 (2013.01); *B64D 2011/0648* (2013.01); *B64D 2011/0662* (2013.01); *B64D 2011/0679* (2013.01)
USPC ................................. 297/411.45; 297/188.14

(58) Field of Classification Search
USPC ............. 297/188.14, 411.2, 148, 217.1, 391, 297/423.1, 411.4, 411.45, 188.05, 284.4, 297/396, 408
See application file for complete search history.

(56) References Cited

U.S. PATENT DOCUMENTS

| | | | | |
|---|---|---|---|---|
| 5,490,710 | A  * | 2/1996  | Dearing et al. | 297/162 |
| 6,092,867 | A  * | 7/2000  | Miller         | 297/188.14 |
| 6,102,476 | A  * | 8/2000  | May et al.     | 297/217.3 |
| 6,641,101 | B2 * | 11/2003 | Bergin         | 248/311.2 |
| D557,953  | S  * | 12/2007 | Mazzera        | D6/501 |
| 7,360,830 | B2 * | 4/2008  | Balensiefer et al. | 297/188.08 |
| 7,766,408 | B2 * | 8/2010  | Lota et al.    | 296/37.1 |
| 7,967,380 | B2 * | 6/2011  | Omori et al.   | 297/284.4 |

(Continued)

FOREIGN PATENT DOCUMENTS

WO    2005060598 A    7/2005

OTHER PUBLICATIONS

International Peliminary Report on Patentability dated Dec. 27, 2013 in Application No. PCT/US2012041816.

(Continued)

*Primary Examiner* — Jose V Chen
(74) *Attorney, Agent, or Firm* — Kilpatrick Townsend & Stockton LLP; Tiffany L. Williams, Esq.; Dean W. Russell, Esq.

(57) ABSTRACT

Described are passenger seat assemblies having at least one seat back support and at least one seat pan coupled to the at least one seat back support. The passenger seat assemblies may also include at least one pair of armrests coupled to the at least one seat back support, a seat support structure having at least one seat pan mounting surface and a framework, wherein the at least one seat pan is coupled to the at least one seat pan mounting surface, and/or at least one headrest pivotally coupled to the at least one seat back support with at least one pair of extensions coupled to the at least one headrest or the at least one seat back support.

15 Claims, 15 Drawing Sheets

(56) References Cited

U.S. PATENT DOCUMENTS

| | | | |
|---|---|---|---|
| 8,016,353 B2* | 9/2011 | Kuno | 297/217.3 |
| 8,052,217 B2* | 11/2011 | Toso et al. | 297/423.12 |
| 8,596,723 B2* | 12/2013 | Ahad | 297/452.14 |
| 2002/0084686 A1* | 7/2002 | Takata | 297/408 |
| 2004/0155495 A1* | 8/2004 | Veneruso | 297/188.14 |
| 2006/0091707 A1 | 5/2006 | Ahad | |
| 2007/0132300 A1* | 6/2007 | Toba | 297/408 |
| 2007/0241233 A1 | 10/2007 | Cona | |
| 2008/0099608 A1 | 5/2008 | Schumacher et al. | |
| 2009/0085383 A1* | 4/2009 | Hicks et al. | 297/217.3 |
| 2009/0152911 A1* | 6/2009 | Ma et al. | 297/188.14 |
| 2009/0322139 A1 | 12/2009 | Clough | |
| 2010/0252680 A1 | 10/2010 | Porter | |
| 2011/0108666 A1 | 5/2011 | Pozzi | |
| 2012/0062010 A1* | 3/2012 | Holmes et al. | 297/354.1 |
| 2013/0147240 A1* | 6/2013 | Lee | 297/188.05 |

OTHER PUBLICATIONS

International Search Report and Written Opinion dated Dec. 5, 2012 in Application No. PCT/US2012041816.

Annex to Form PCT/ISA/206 dated Sep. 14, 2012 in Application No. PCT/US2012041816.

* cited by examiner

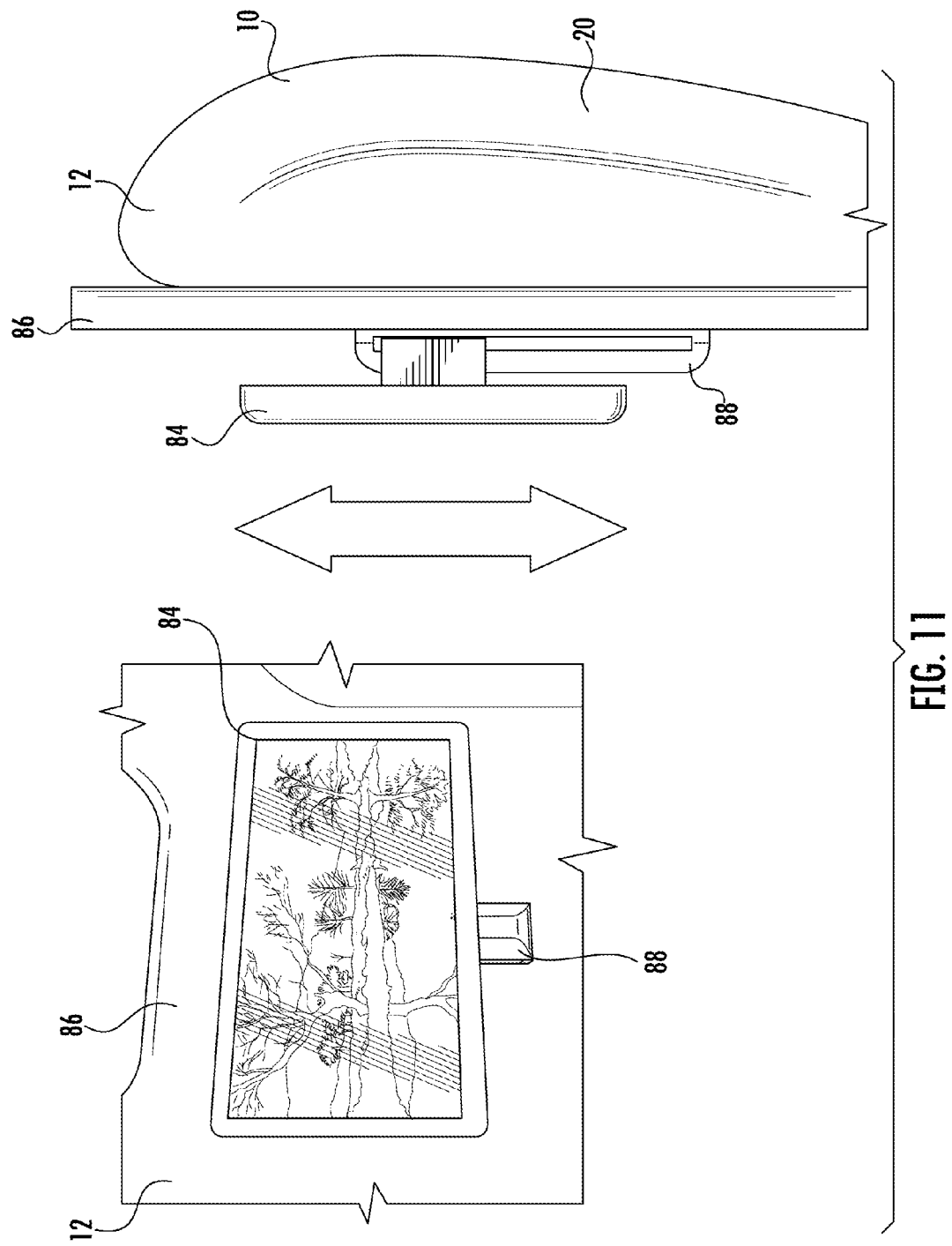

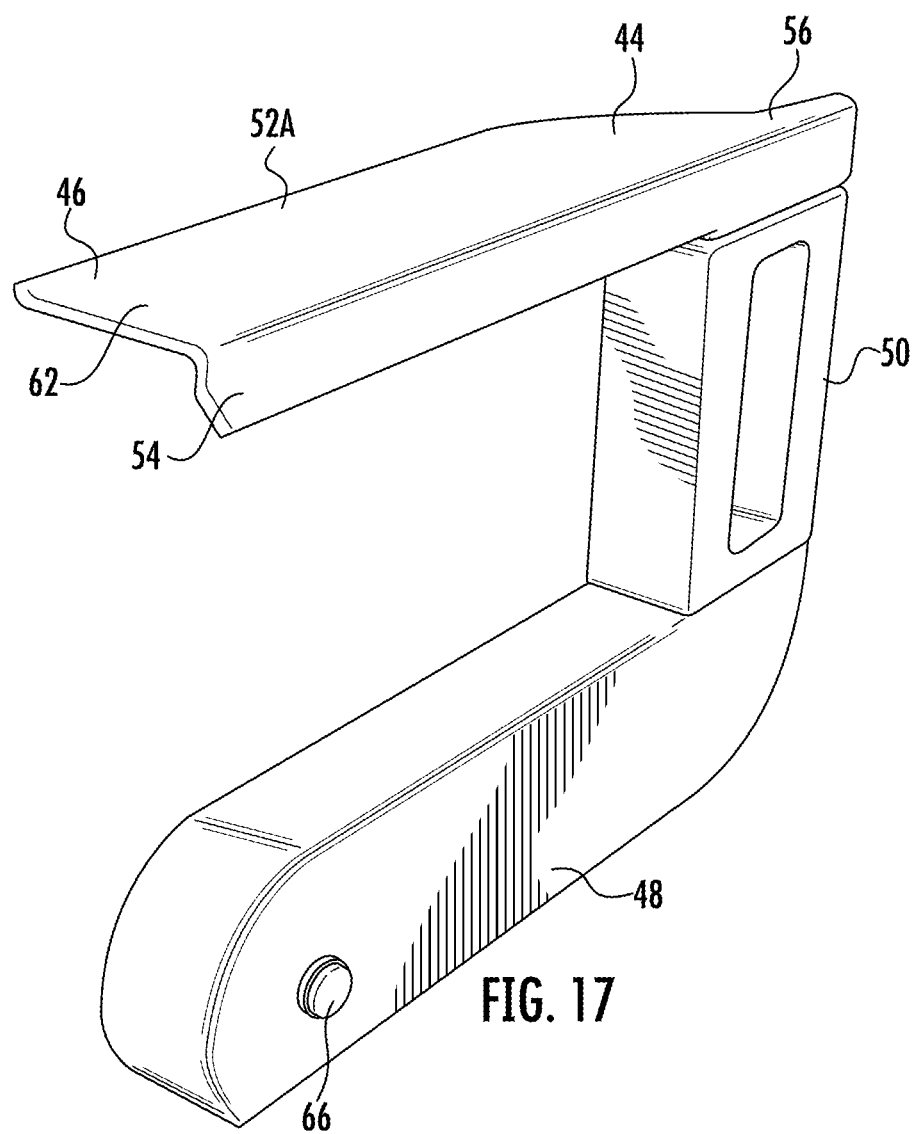
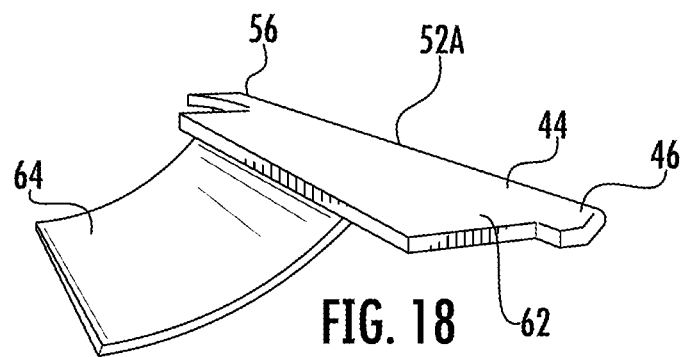

PASSENGER SEAT ASSEMBLY

CROSS REFERENCE TO RELATED APPLICATION

This application is related to and claims priority benefits from U.S. Provisional Application Ser. No. 61/520,538, filed on Jun. 10, 2011, entitled AIRPLANE SEAT CONCEPT, (the "'538 application") and U.S. Provisional Application Ser. No. 61/501,885, filed on Jun. 28, 2011, entitled RECLINING HEADREST (the "'885 application"). The '538 and '885 applications are hereby incorporated herein in their entireties by this reference.

FIELD OF THE INVENTION

The invention relates to passenger seats or the like.

BACKGROUND

In various modes of transportation, a passenger may be subjected to a passenger seat for various lengths of time. In airline travel, for example, it is not uncommon for a passenger to be seated in a passenger seat for multiple hours. During such time, a passenger's overall comfort may suffer due to a lack of proper head and neck support, arm support, and/or foot support.

For example, traditional passenger seats may not provide sufficient adjustment to provide each passenger with an amount of head or neck support (or comfort level) that he or she requires or desires. As a result, passengers typically bring personal items, such as pillows and blankets, on board to achieve such support. These items may be quite cumbersome, however, and typically intrude into the personal space of another passenger. In many cases, armrests are also shared by passengers seated in adjoining seats. This shared use may prove awkward or uncomfortable for many passengers, who may simply concede an armrest to the exclusive use of the other passenger, consequently foregoing arm support. Furthermore, the area below the next forward passenger seat may be utilized for stowage of personal items, as well as a location for a passenger's feet.

Thus, it may be desirable to provide passenger seats with easily adjustable structures to support each passenger's head and/or neck, while eliminating the need for personal items to achieve a similar result, armrests that provide for dual usage without the need to compete for usage, and/or a seat support structure that provides sufficient stowage capacity, while also providing some support for a passenger's feet.

Furthermore, traditional passenger seats typically provide tray tables stowed in a seat back of a next forward passenger seat, which may be jarred or disturbed when the seat back is reclined. In certain seats, the tray table location may be positioned within an armrest. However, in certain cases, the additional weight and space required to stow the tray tables within the armrest may be undesirable. Thus, it may be desirable to provide passenger seats with removable tray tables that are not positioned on the next forward passenger seat, while also not increasing the weight and/or consuming valuable space within the passenger seat.

SUMMARY

Embodiments of the present invention include a passenger seat assembly comprising at least one seat back support and at least one seat pan coupled to the at least one seat back support. The at least one seat back support may further comprise a lumbar support.

In certain embodiments, the passenger seat assembly may further comprise at least one pair of armrests coupled to the at least one seat back support. In some embodiments, at least one armrest of the at least one pair of armrests may be configured to releasably couple to a tray table. Each armrest may comprise an upper portion further comprising at least two overlapping sections arranged so that a forward portion of a top section does not overlap an aft portion of a bottom section, as well as a lower portion spaced apart from the upper portion by a spacer, wherein the lower portion may be configured to stow in-flight entertainment devices.

In some embodiments, the passenger seat assembly may further comprise a seat support structure comprising at least one seat pan mounting surface and a framework, wherein the at least one seat pan is coupled to the at least one seat pan mounting surface. The framework may be divided into multiple stowage compartments. The seat support structure may further comprise at least one footrest, which may comprise a surface inclined at approximately a 7 degree angle.

In certain embodiments, the passenger seat assembly may further comprise at least one headrest pivotally coupled to the at least one seat back support, and at least one pair of extensions coupled to the at least one headrest or the at least one seat back support, wherein the at least one pair of extensions are adapted to be positioned adjacent a passenger's head when the at least one headrest is in a reclined position. The at least one pair of extensions may be pivotally coupled to the at least one headrest. The at least one headrest may be slidingly coupled to the at least one seat back support via a support bar. The at least one headrest may be coupled to at least one support panel pivotally coupled to the at least one seat back support.

In some embodiments, the passenger seat assembly may further comprise an in-flight entertainment display, which may be slidingly coupled to an aft surface of the at least one seat back support.

BRIEF DESCRIPTION OF THE DRAWINGS

FIG. 11 are front and side views of an in-flight entertainment display of a passenger seat assembly according to certain embodiments of the present invention.

FIG. 17 is a front perspective view of an armrest of a passenger seat assembly according to certain embodiments of the present invention.

FIG. 18 is a partial perspective view of the armrest of FIG. 17, showing an extension.

DETAILED DESCRIPTION

Figure 1:
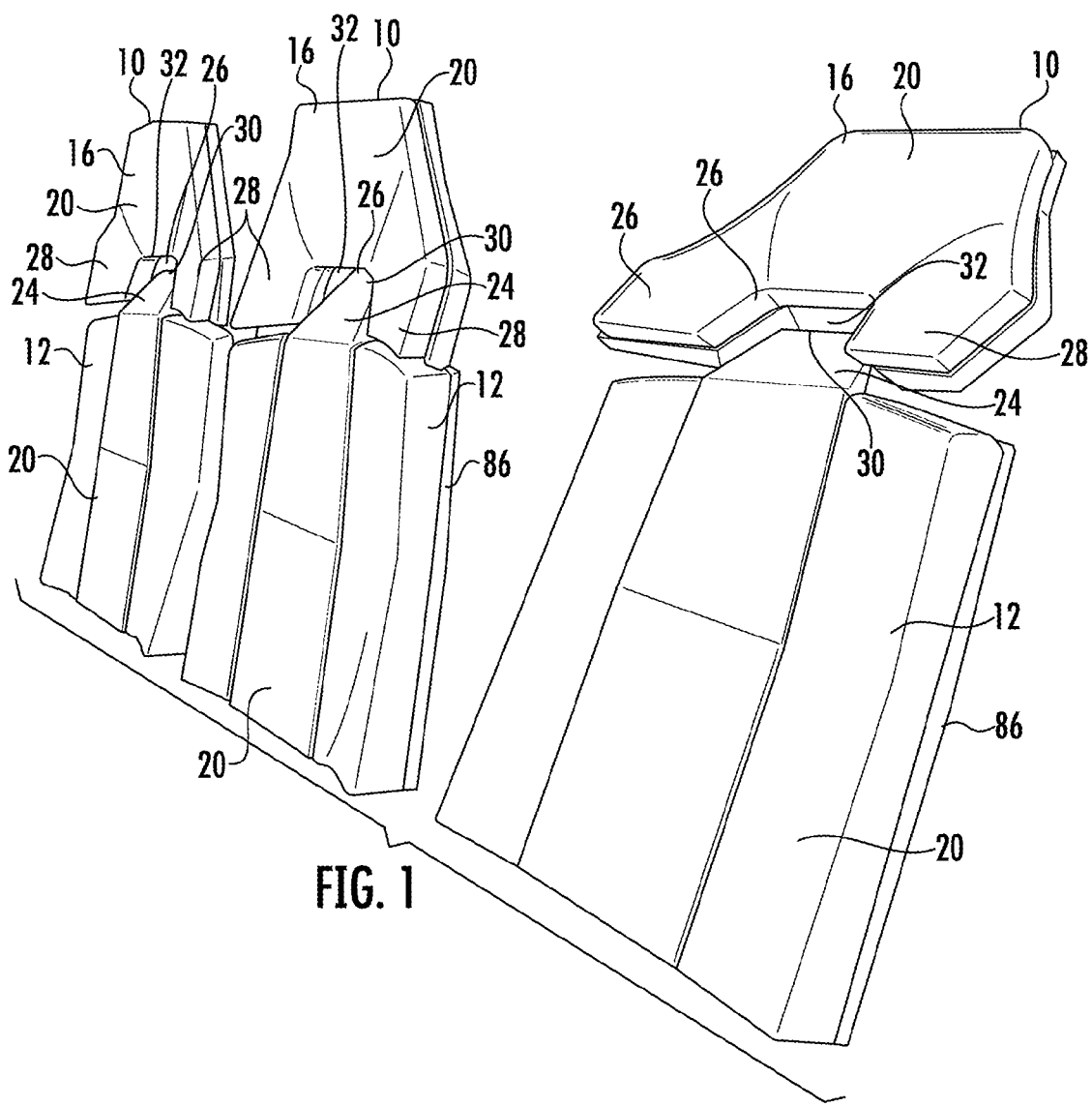
FIG. 1 is a front perspective view of a plurality of seat back supports of a passenger seat assembly according to some embodiments of the present invention, showing headrests in an upright position and a reclined position.
Figure 4:
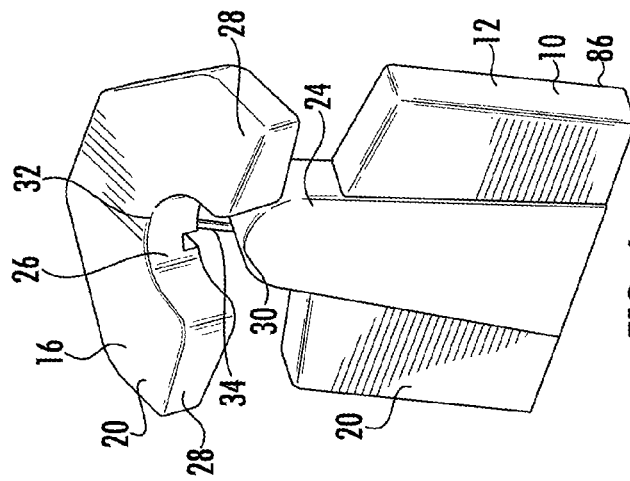
FIG. 4 is a front perspective view of the seat back support of FIG. 2, showing the headrest in a reclined position.
Figure 3:
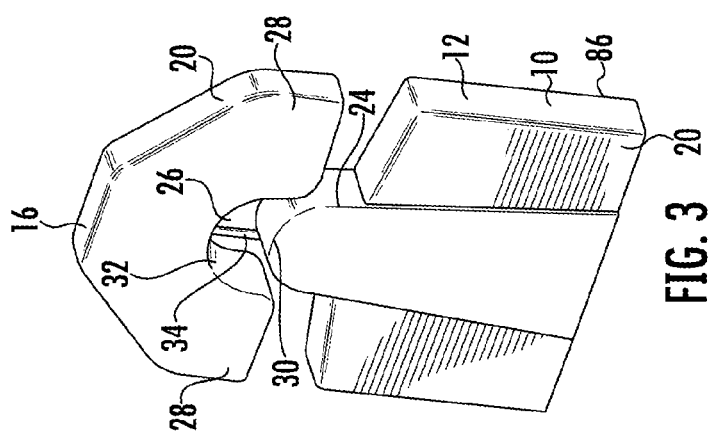
FIG. 3 is a front perspective view of the seat back support of FIG. 2, showing the headrest in an extended position.
Figure 2:
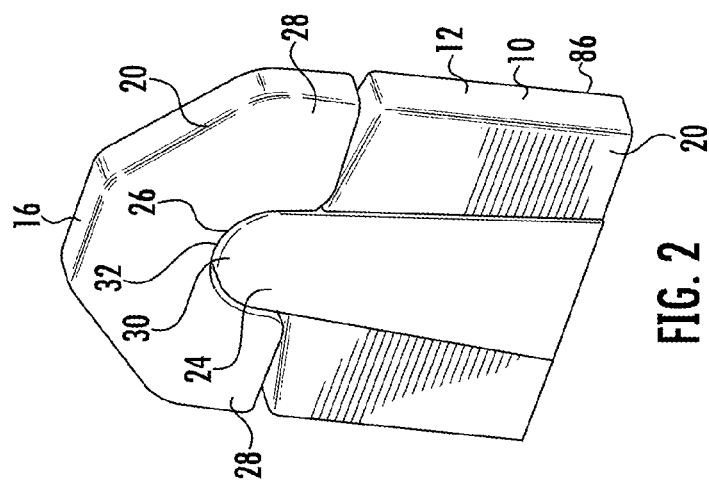
FIG. 2 is a front perspective view of a seat back support of a passenger seat assembly according to certain embodiments of the present invention, showing a headrest in an upright position.

The described embodiments of the invention provide passenger seat assemblies. While the passenger seat assemblies are discussed for use with aircraft seats, they are by no means so limited. Rather, embodiments of the passenger seat assemblies may be used in passenger seats or other seats of any type or otherwise as desired.

FIGS. 1-25 illustrate embodiments of a passenger seat assembly 10. In these embodiments, the passenger seat assembly 10 comprises at least one seat back support 12, at least one seat pan 14, at least one headrest 16, and at least one seat support structure 18. The seat back support 12, the seat pan 14, the headrest 16, and the seat support structure 18 may be formed of materials including but not limited to composite plastics, aluminum, stainless steel, other metallic materials, composite materials, or other similar materials.

The seat back support 12 may provide a foundation, form, and shape for the passenger seat assembly 10 and may provide support for a passenger's body. The seat back support 12 may have any suitable seat-like shape, including but not limited to linear, curvilinear, or other suitable shapes.

In certain embodiments, the seat pan 14 may be pivotally coupled to the seat back support 12, wherein the amount of angle between the seat back support 12 and the seat pan 14 may be adjustable to a particular angle by a passenger. Any suitable recline mechanism may be used to adjust the position of the seat back support 12 including but not limited to a recline lock or other suitable mechanism that releasably locks the seat back support 12 at any suitable position between and including fully upright and fully reclined positions.

In some embodiments, a cushion 20 may be coupled to the seat back support 12, the seat pan 14, and/or the headrest 16. The internal composition of the cushion 20 may include any suitable material that provides a comfortable resting location for a passenger, while providing a durable material that will withstand repeated usage. The type of internal cushion material includes but is not limited to viscoelastic materials, foam materials, honeycomb-shaped materials, cushioning materials, or other similar materials. The covering of the cushion 20 may be formed of any suitable material including but not limited to textiles, woven or nonwoven fabrics, leather, synthetic materials, plastics, or other similar materials.

Figure 10:
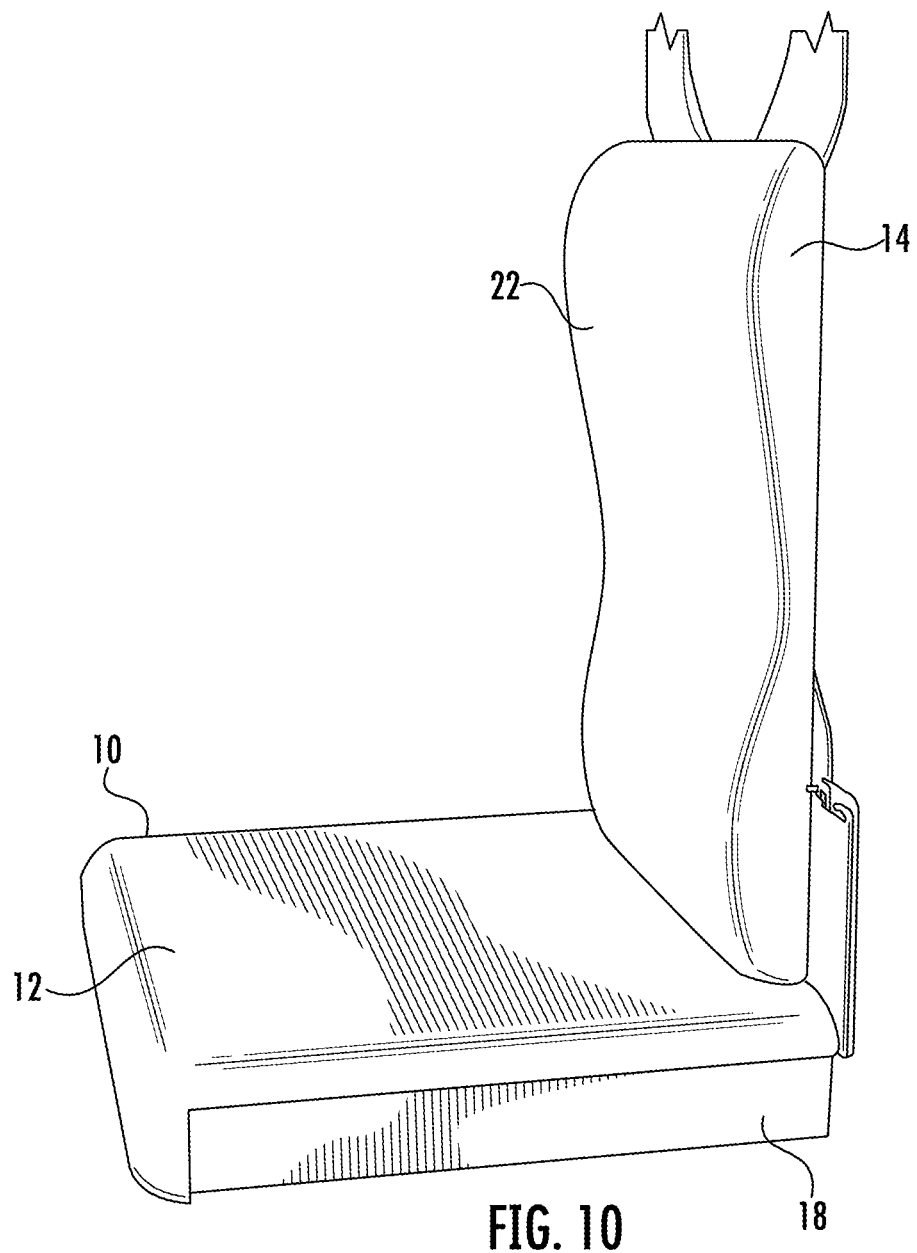
FIG. 10 is a side perspective view of a lumbar support of a passenger seat assembly according to certain embodiments of the present invention.
Figure 13:
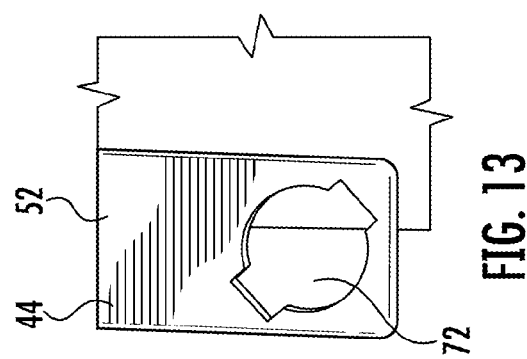
FIG. 13 is a partial top view of an armrest of the passenger seat assembly of FIG. 12.
Figure 12:
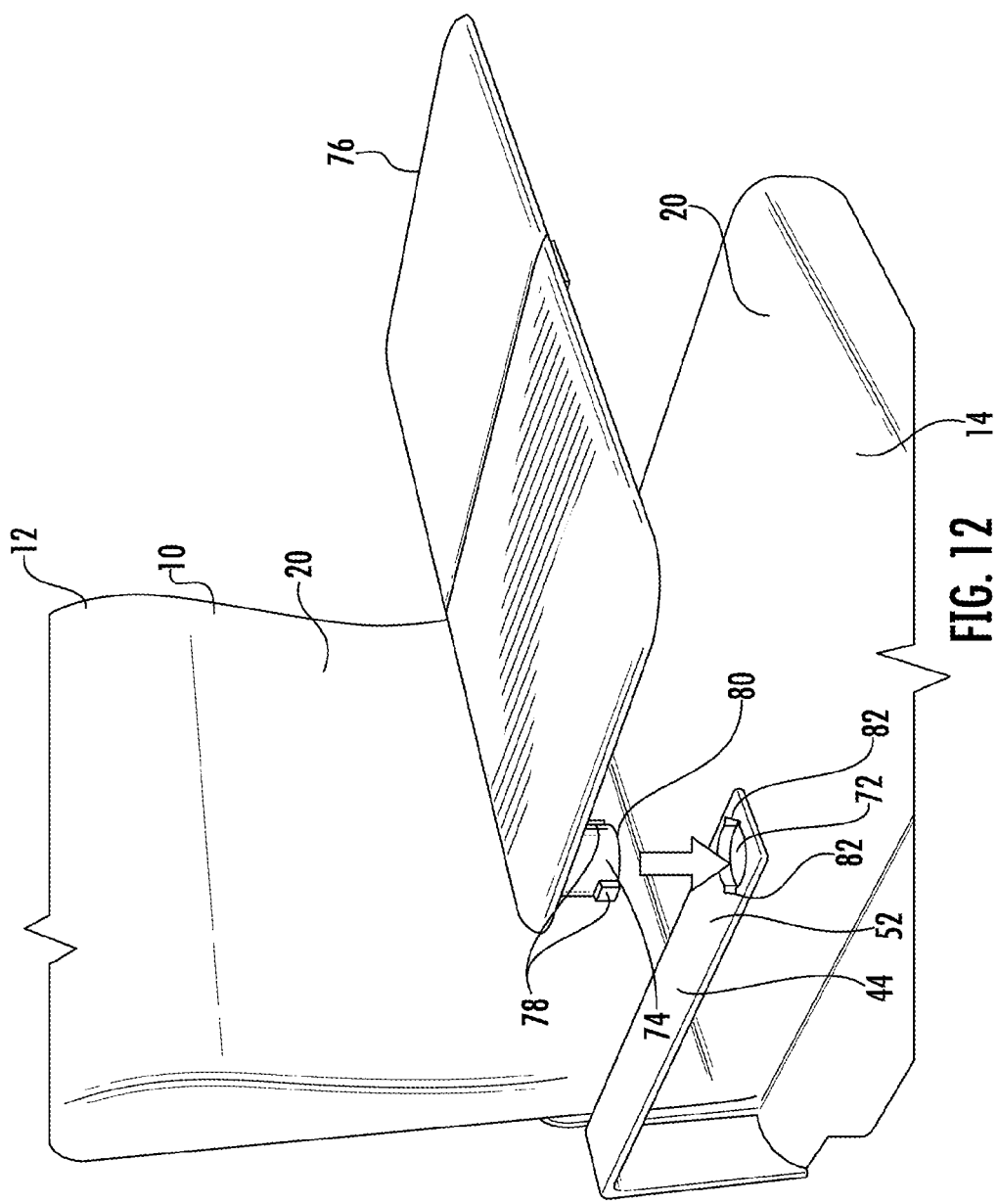
FIG. 12 is a front perspective view of a removable tray table of a passenger seat assembly according to certain embodiments of the present invention.
Figure 14:
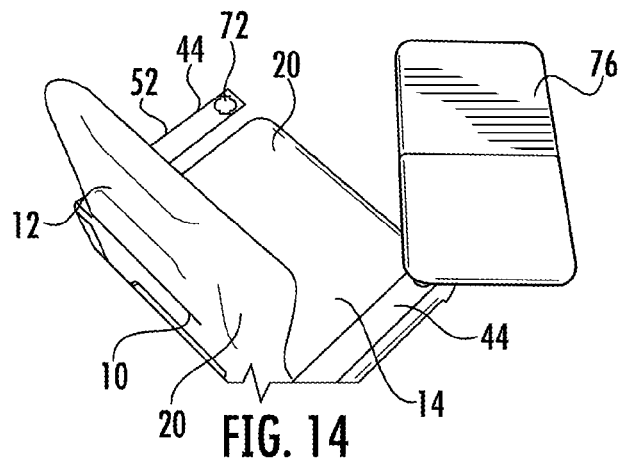
FIG. 14 is a top perspective view of the passenger seat assembly of FIG. 12, showing the tray table in a removal position.
Figure 15:
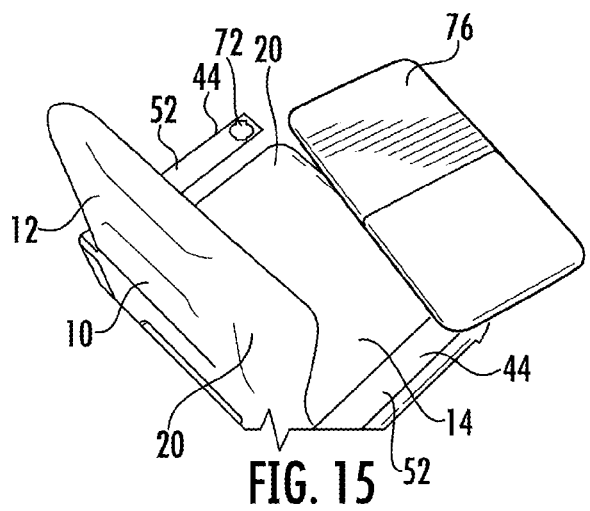
FIG. 15 is a top perspective view of the passenger seat assembly of FIG. 12, showing the tray table partially rotated into an installed position.
Figure 16:
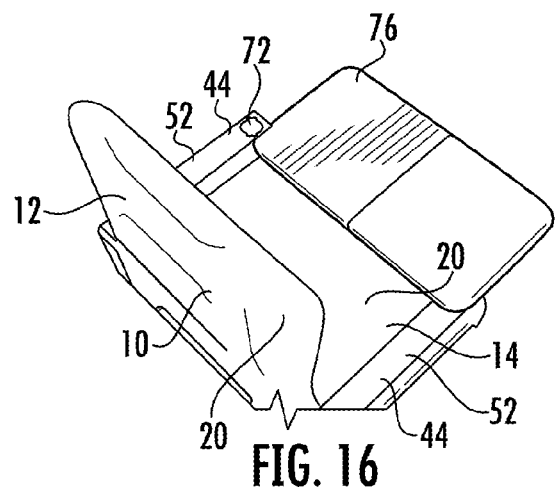
FIG. 16 is a top perspective view of the passenger seat assembly of FIG. 12, showing the tray table rotated into an installed position.
Figure 19:
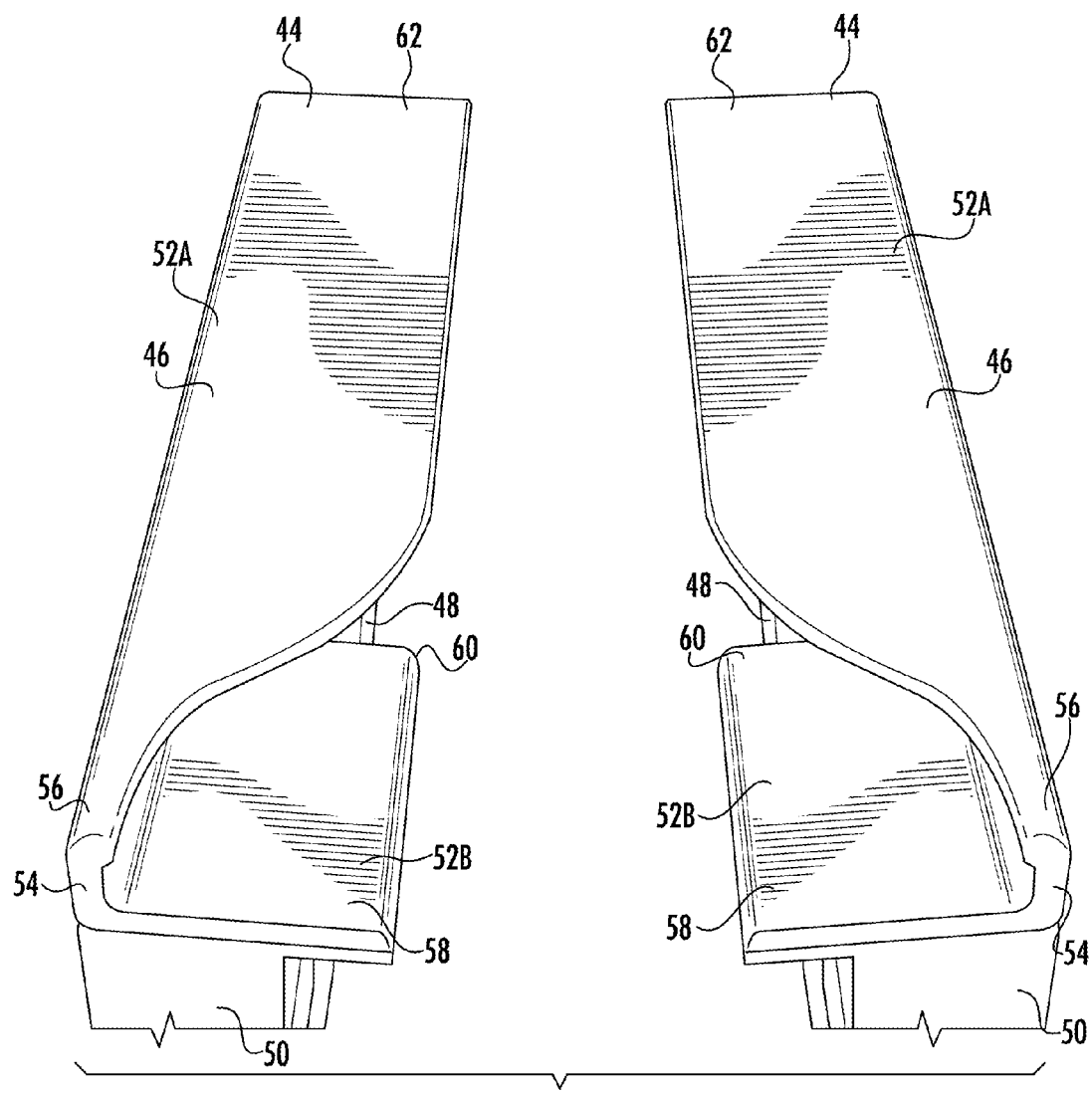
FIG. 19 is a rear perspective view of a pair of the armrests of FIG. 17.
Figure 20:
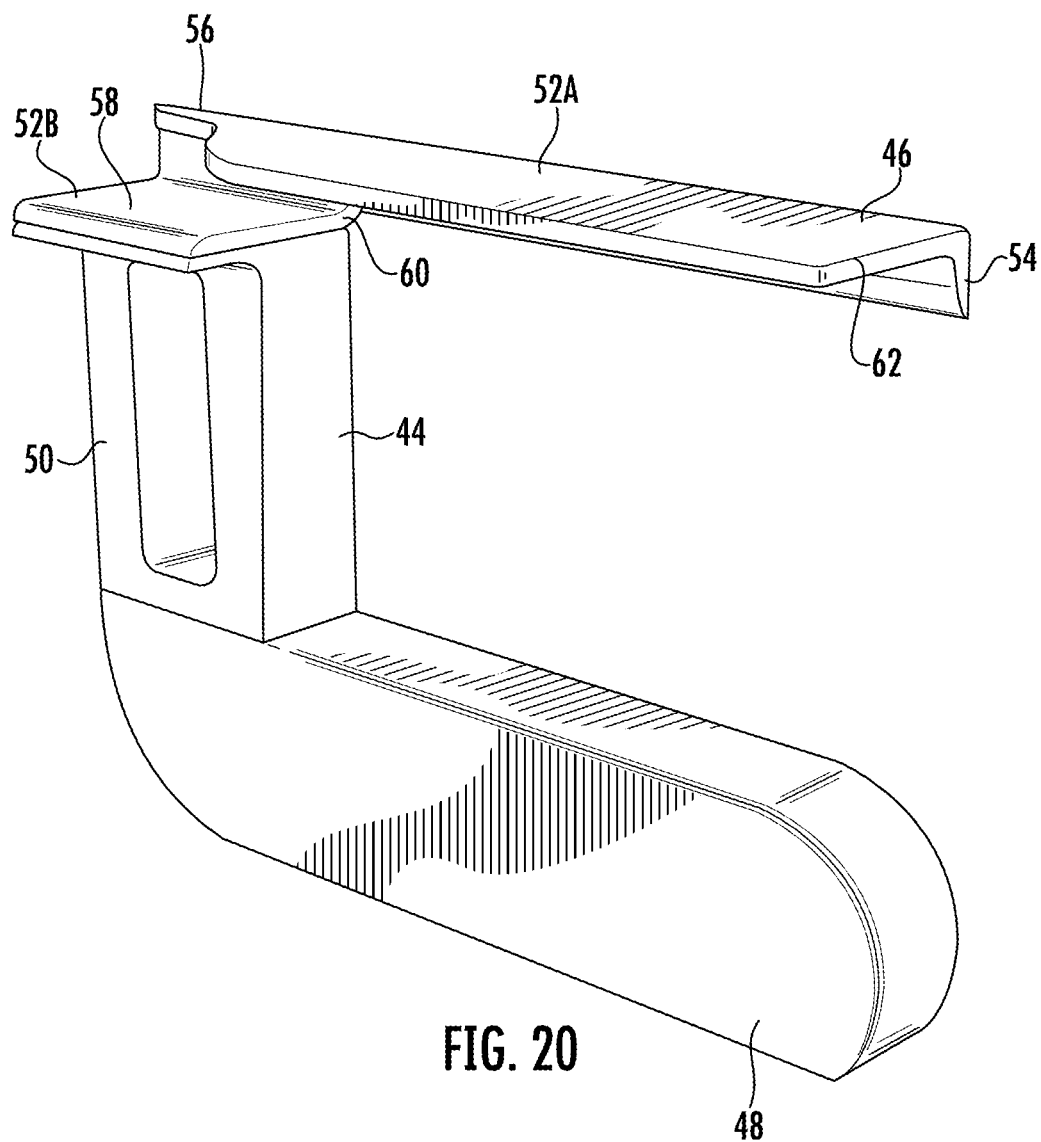
FIG. 20 is another front perspective view of the armrest of FIG. 17.
Figure 21:
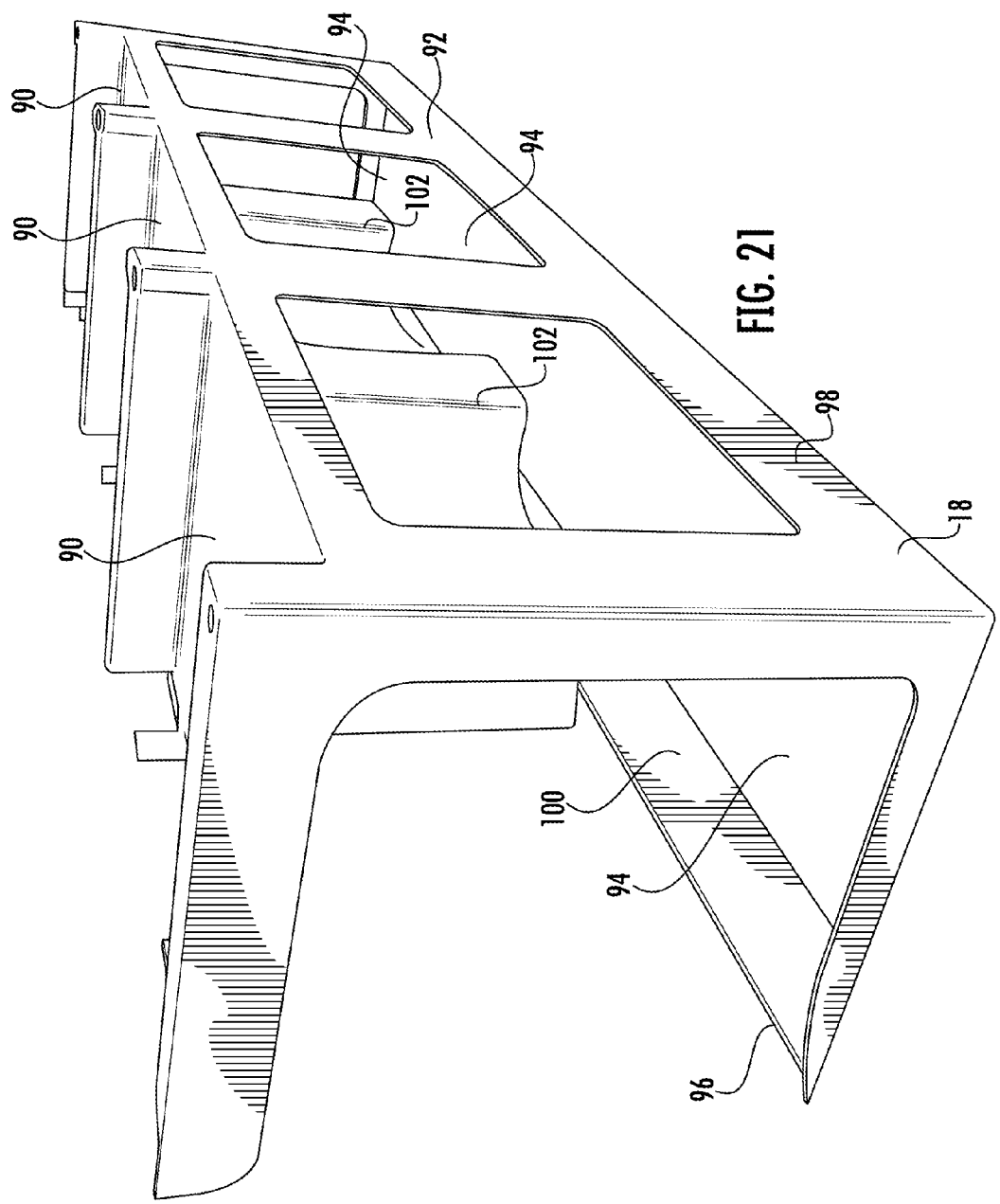
FIG. 21 is a front perspective view of a seat support structure of a passenger seat assembly according to certain embodiments of the present invention.
Figure 22:
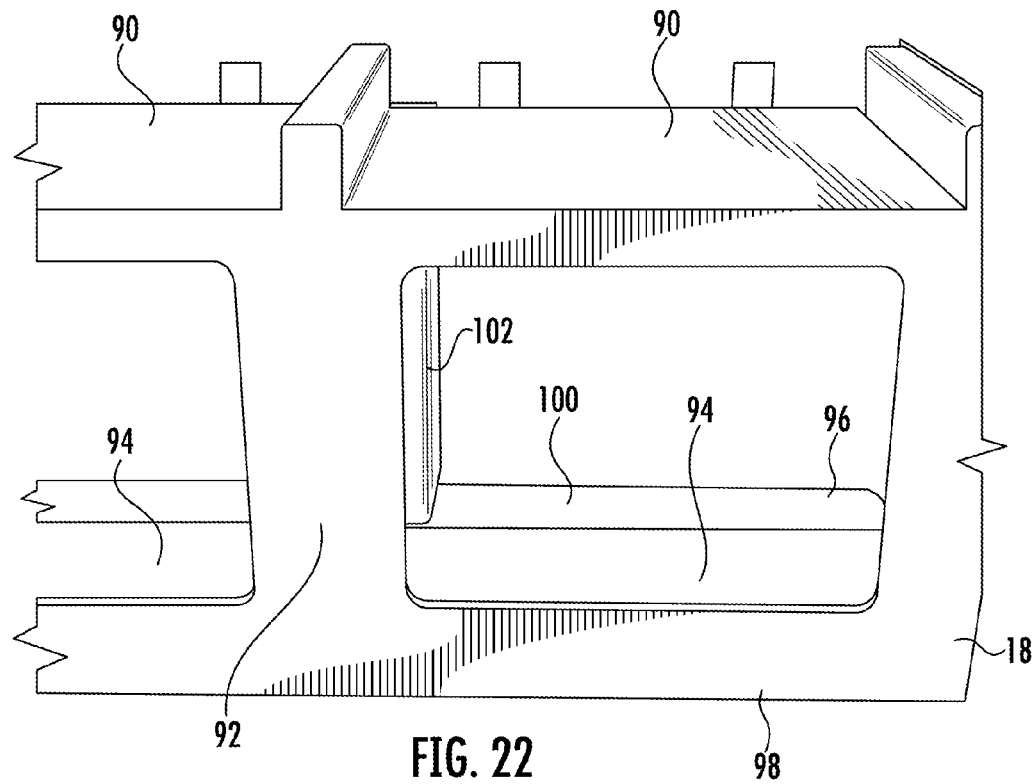
FIG. 22 is a front view of the seat support structure of FIG. 21.
Figure 23:
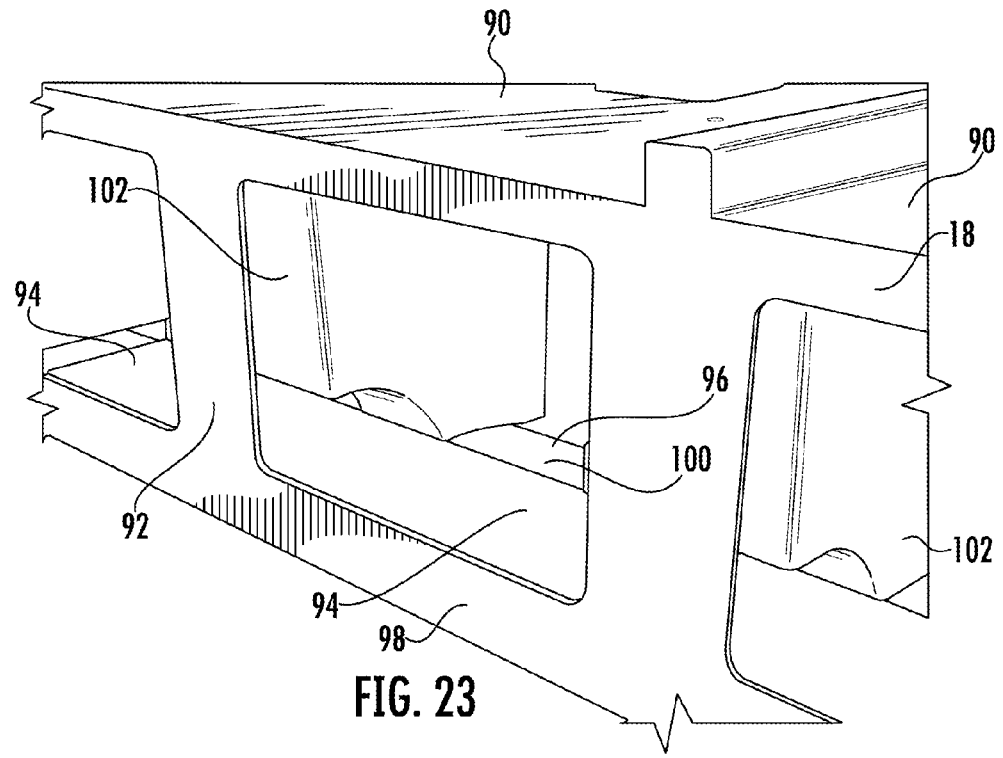
FIG. 23 is a partial front perspective view of the seat support structure of FIG. 21.
Figure 24:
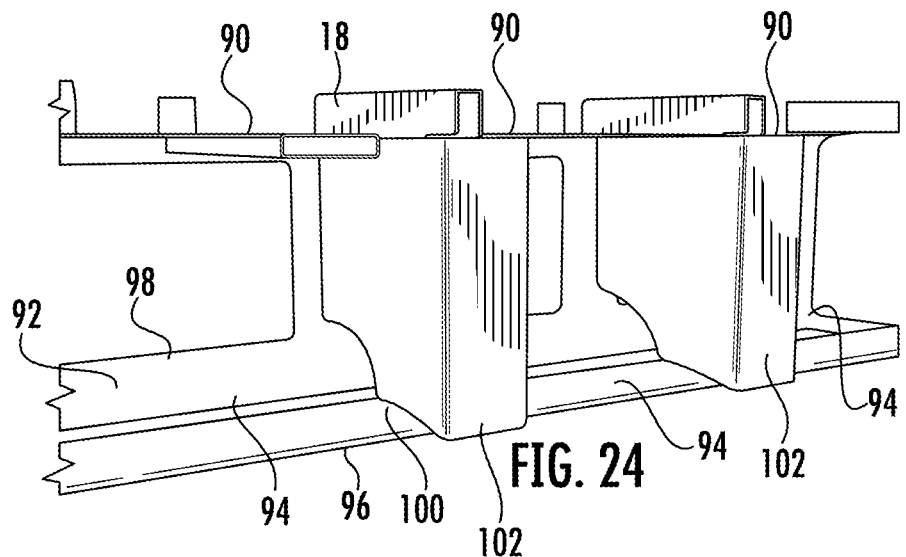
FIG. 24 is a partial rear perspective view of the seat support structure of FIG. 21.
Figure 25:
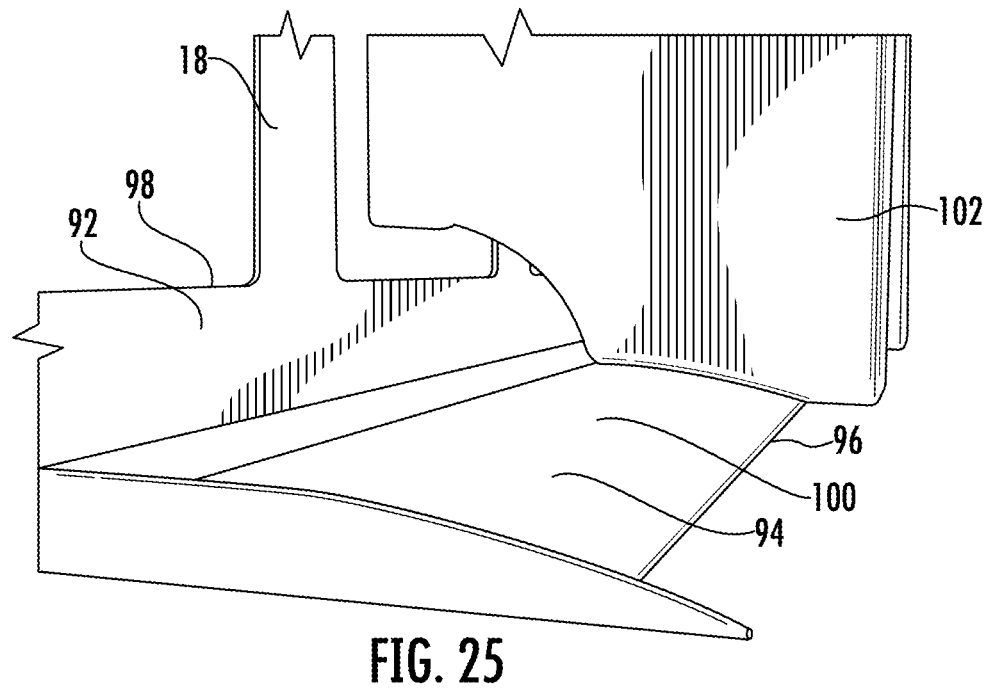
FIG. 25 is a partial rear perspective view of the seat support structure of FIG. 21.

In certain embodiments, as illustrated in FIG. 10, the seat back support 12 may further comprise a lumbar support 22. The lumbar support 22 may be configured to provide approximately 0.6 inches of rigid support. However, one of ordinary skill in the relevant art will understand that the lumbar support may be configured to provide any suitable amount of rigid support as needed. In these embodiments, the lumbar support 22 may be covered with the cushion 20. The cushion 20 adjacent the lumbar support 22 may be configured to have a thickness of up to 1.3 inches or more of internal cushion material.

In certain embodiments, as shown in FIGS. 1-9, the headrest 16 may be coupled to the seat back support 12. In these embodiments, as illustrated in FIGS. 1-6, the seat back support 12 may comprise a projection 24 that is configured to fit within a corresponding receptacle 26 on the headrest 16. The projection 24 and/or receptacle 26 may have any suitable shape, including but not limited to semi-circular, parabola, oval, rectilinear, triangular, rhombus, or other suitable shape. In these embodiments, the sides of the receptacle 26 may be formed by a pair of extensions 28. The projection 24 may be configured to have a surface that is substantially parallel to the upper surface of the seat back support 12 (as shown in FIGS. 2-6), may be configured to taper aft (as shown in FIG. 1), may have a concave surface configured to contour to the sides of a passenger's head, may have a convex surface configured to support a passenger's head, or any other suitable shape as needed to provide the desired amount of support for a passenger's head.

An upper edge 30 of the projection 24 may be pivotally coupled to an upper edge 32 of the receptacle 26, as shown in FIGS. 1-6. As a result, when the headrest 16 pivots in an aft direction, an upper portion of the headrest 16 rotates aft, while the pair of extensions 28 rotate forward so as to be positioned adjacent a passenger's head so as to provide additional support for the passenger's head and/or neck.

The headrest 16 may also be coupled to at least one support bar 34 that extend from the seat back support 12. In certain embodiments, the support bar 34 may extend from an aft location adjacent the projection 24, through the projection 24, or any other suitable location that allows the headrest 16 to pivot relative to the seat back support 12. A sliding coupling mechanism between the headrest 16 and the support bar 34 and/or between the support bar 34 and the seat back support 12 may be utilized so that the height of the headrest 16 may be adjusted as desired.

Figure 5:
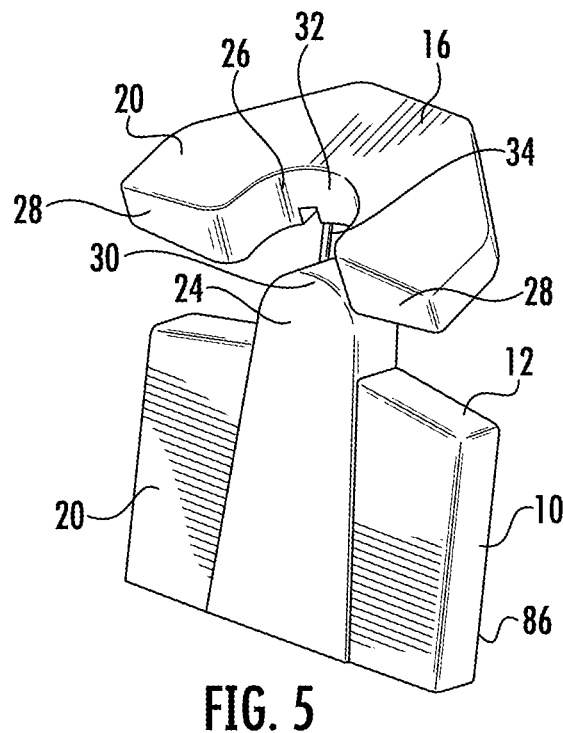
FIG. 5 is a front perspective view of the seat back support of FIG. 2, showing a headrest in a reclined position and extensions in a straight position.
Figure 6:
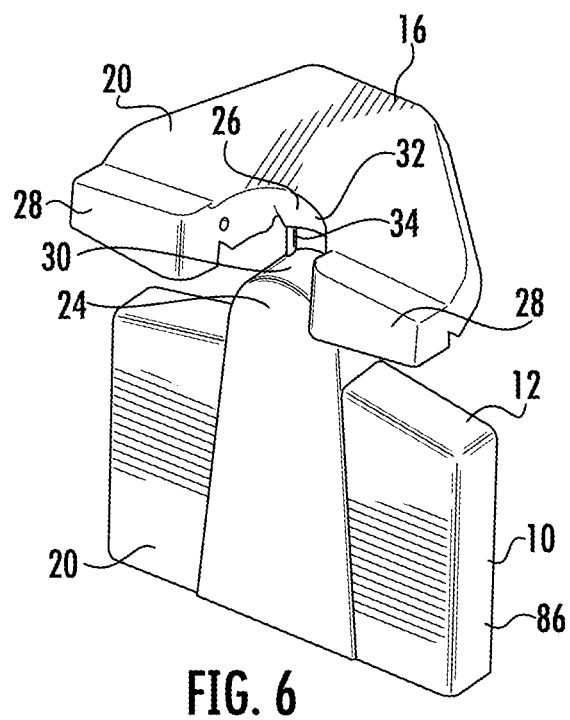
FIG. 6 is a front perspective view of the seat back support of FIG. 2, showing the headrest in a reclined position and extensions in a rotated position.

In some embodiments, as shown in FIGS. 5-6, the extensions 28 may be pivotally coupled to the headrest 16 so as to provide additional support for the passenger's head and/or neck. In some embodiments, the extensions 28 may be coupled to the headrest 16 by a variety of mechanisms, including but not limited to hinges, fasteners, rods, and other pivotally coupling mechanisms. In some embodiments, the extensions 28 may be pivotally coupled to the headrest 16 via a friction hinge, which relies on a constant friction force within the hinge to hold a position until an excessive torque is applied to overcome the hinge resistance torque and move each extension 28 to another position within its range of motion. As a result, the extensions 28 may only be adjusted by direct, intentional force or manipulation by the passenger. In some embodiments, the friction force between the extensions 28 and the headrest 16 will likewise prevent unintentional adjustment of the extensions 28. In other embodiments, the extensions 28 may be secured into place after adjustment by a variety of manners, including but not limited to a locking mechanism.

Figure 7:
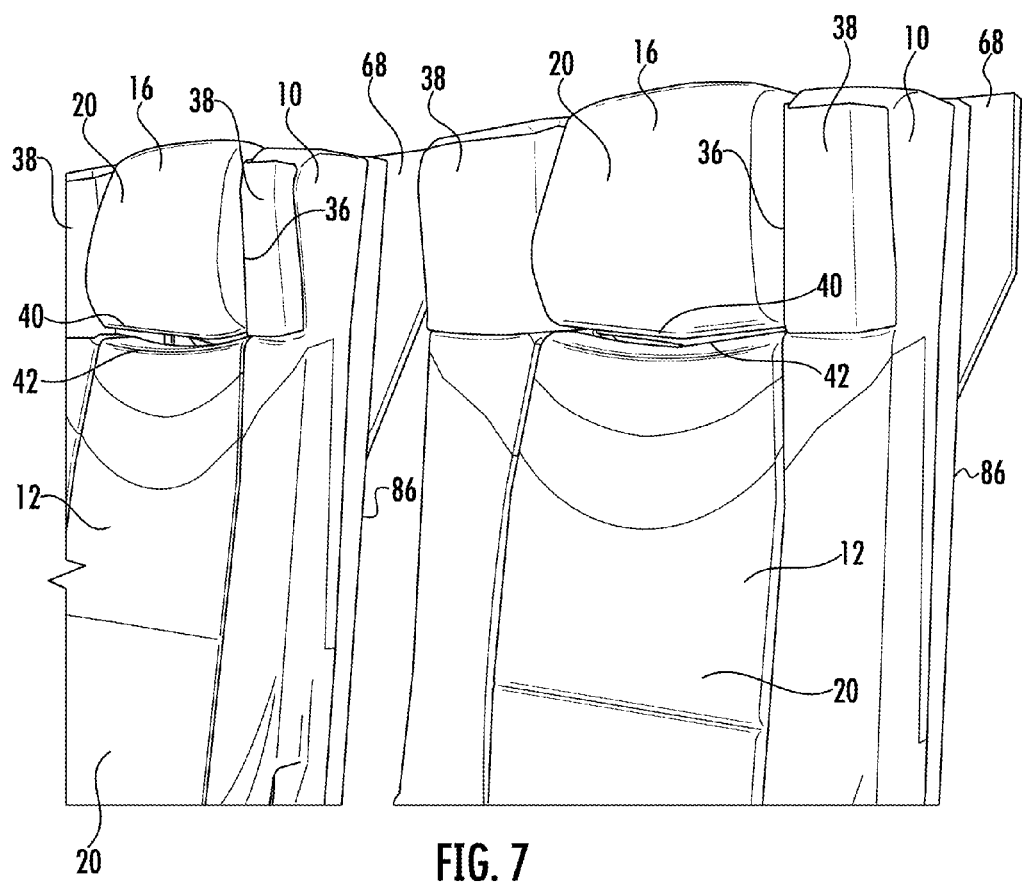
FIG. 7 is a front perspective view of a plurality of seat back supports of a passenger seat assembly according to certain embodiments of the present invention, showing headrests in an upright position.
Figure 8:
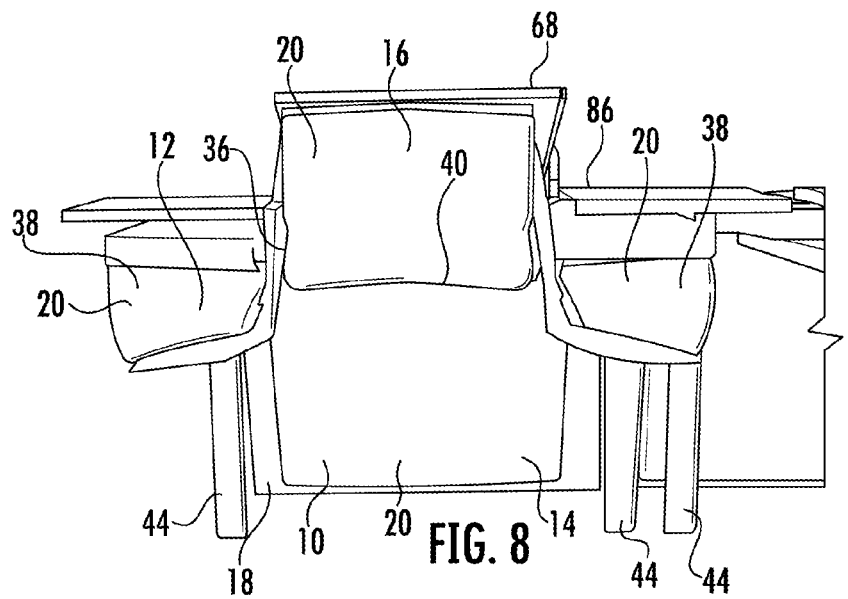
FIG. 8 is a partial top view of the passenger seat assembly of FIG. 7, showing the headrest in a reclined position.
Figure 9:
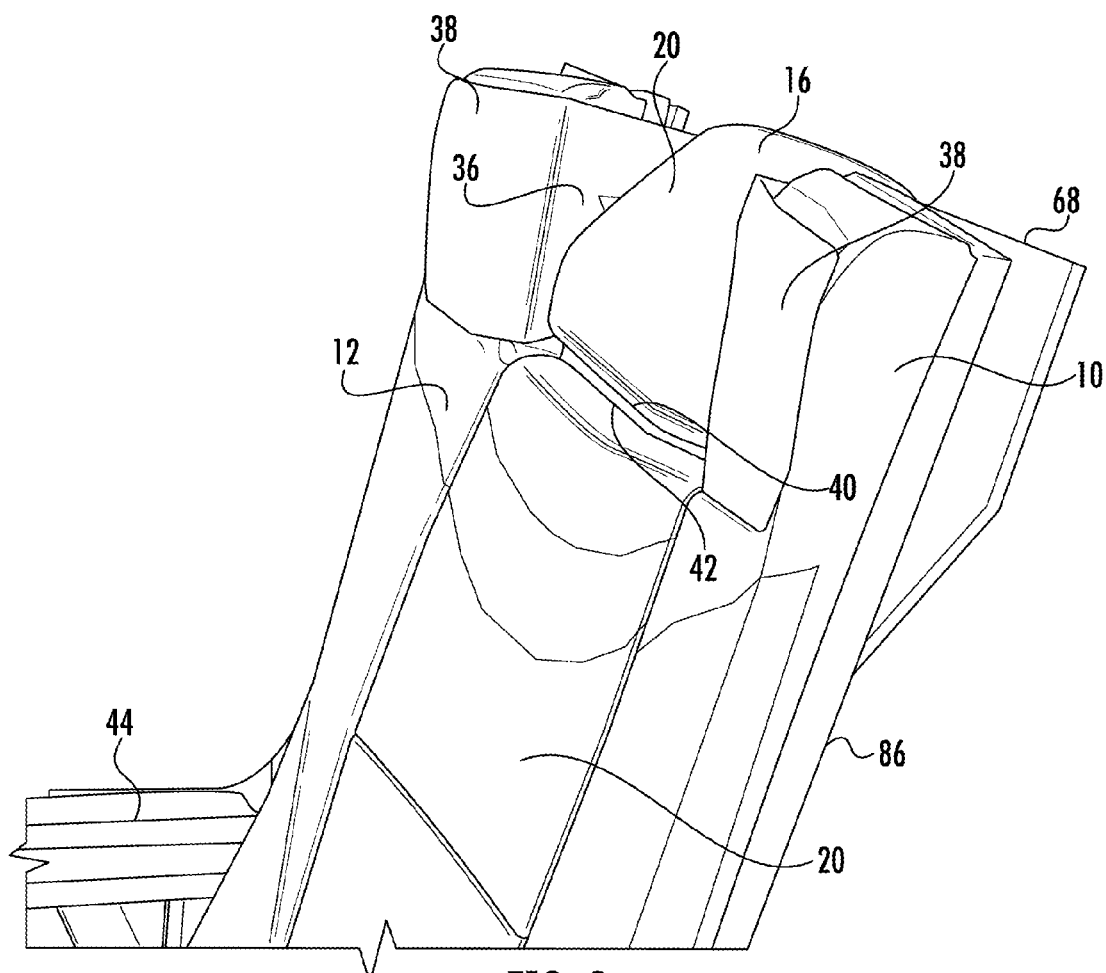
FIG. 9 is a partial side perspective view of the passenger seat assembly of FIG. 7, showing the headrest in a reclined position.

In certain embodiments, as shown in FIGS. 7-9, the seat back support 12 may comprise a recess 36 that is configured to receive the corresponding headrest 16. The recess 36 and headrest 16 may have any suitable shape, including but not limited to semi-circular, parabola, oval, rectilinear, triangular, rhombus, or other suitable shape. In these embodiments, the sides of the recess 36 may be formed by a pair of extensions 38.

A lower edge 40 of the headrest 16 may be pivotally coupled to a lower edge 42 of the recess 36, as shown in FIGS. 7-9. As a result, when the headrest 16 pivots in an aft direction, the pair of extensions 38 remain positioned adjacent a passenger's head so as to provide additional support for the passenger's head and/or neck.

The at least one headrest 16 may also be coupled to at least one support panel 68 that is pivotally coupled to the at least one seat back support 12 adjacent and aft of the at least one headrest 16. In some embodiments, the support panel 68 may be coupled to the seat back support 12 by a recline lock or other suitable mechanism that releasably locks the headrest 16 at any suitable position between and including fully upright and fully reclined positions.

In certain embodiments, as shown in FIGS. 8-9, 12, and 14-20, at least one pair of armrests 44 may be coupled to the at least one seat back support 12. Each armrest 44 may comprise an upper portion 46 and a lower portion 48. The upper portion 46 may be coupled to the lower portion 48 via a spacer 50.

In certain embodiments, the upper portion 46 may comprise at least two overlapping sections 52A, 52B, wherein the overlapping sections 52A, 52B may be spaced apart and coupled to one another via a side 54. In other embodiments, the overlapping sections 52A, 52B may be coupled to one another directly. In yet other embodiments, the upper portion 46 may comprise a single section 52, as shown in FIGS. 12 and 14-16. In these embodiments, as shown in FIGS. 17-20, an aft portion 56 of the top section 52A may taper toward the side 54, wherein an aft portion 58 of the bottom section 52B is then no longer covered by the top section 52A. Additionally, the aft portion 58 of the bottom section 52B may be coupled to the spacer 50, and a forward portion 60 of the bottom section 52B may be shaped so as not to extend the entire length of the top section 52A, wherein a forward portion 62 of the top section 52A is then no longer covered by the bottom section 52B.

As a result, the overlapping arrangement of the upper portion 46 may allow two passengers to utilize each armrest 44 simultaneously. For example, a passenger seat on a side of the armrest 44 adjacent the side 54 may access the forward portion 62 of the top section 52A, such as for support of the passenger's forearm. A passenger seated on a side of the armrest 44 opposite the side 54 may then access the aft portion 58 of the bottom section 52B, such as for support of the passenger's elbow. The upper portion 46 may further comprise an extension 64 that may be deployed from below the top section 52A, as illustrated in FIG. 18. The extension 64 may be configured to provide additional surface area to support a passenger's forearm that is seated on a side of the armrest 44 opposite the side 54. By including dual-level surfaces, the armrest 44 may be more easily shared by two passengers.

By configuring the upper portion 46 so that the forward portion 62 of the top section 52A is not covered by the bottom section 52B, additional space is available between the upper portion 46 and the lower portion 48 and less material is required to form the upper portion 46. Further, by configuring the spacer 50 to be positioned adjacent the aft portion 58 of the upper portion 46 and the lower portion 48, additional space is available to stow in-flight entertainment ("IFE") and/or seat recline devices in the lower portion 48. For example, as shown in FIG. 17, the position of a seat recline mechanism 66 may be positioned adjacent the lower portion 48. The lower portion 48 and/or upper portion 46 may also include power and/or audio receptacles, sound controls, a control panel with lighting switches, flight attendant call buttons, in-flight entertainment controls, recline control, or any other suitable control mechanism related to operation of the passenger seat assembly 10 or any of its amenities.

In certain embodiments, as illustrated in FIGS. 12-16, at least one armrest 44 may include an aperture 72 that is configured to couple with a leg 74 of a removable tray table 76. The leg 74 may include projections 78 adjacent an end 80 of the leg 74. The projections 78 may be configured to align with similarly positioned receptacles 82 along the circumference of the aperture 72. The combination of projections 78 and receptacles 82 may be configured to allow the leg 74 to pass through the aperture 72 and also lock the tray table 404 into position when the tray table 404 is rotated relative to the aperture 72. However, one of ordinary skill in the relevant art will understand that any suitable releasable coupling mechanism may be used to join the tray table 72 to the armrest 44.

At least one IFE display 84 may be slidingly coupled to an aft surface 86 of the seat back support 12. In these embodiments, a track 88 may be included on the aft surface 86, which is configured to mechanically mount and electrically couple to the IFE display 84. As a result, a passenger seated in the next aft passenger seat assembly 10 may adjust the IFE display 84 to a suitable viewing height to increase the comfort of that passenger.

In some embodiments, as illustrated in FIGS. 21-25, the seat pan 14 may be coupled to the seat support structure 18. The seat support structure 18 may comprise at least one seat pan mounting surface 90 that is coupled to a framework 92, which is in turn mounted to a floor of a vehicle cabin. The seat support structure 18 may be configured to provide support for up to three passenger seat assemblies 10. However, one of ordinary skill in the relevant art will understand that the seat support structure 18 may be configured to provide support for additional passenger seat assemblies 10 as needed or desired.

The framework 92 may also be configured to provide stowage compartments 94 below the seat pan mounting surface 90 from an aft side 96, while also providing a barrier to prevent luggage from escaping the framework 92 on a forward side 98. A lower surface 100 may be coupled to the framework 92 and positioned below the stowage compartments 94. In some embodiments, the lower surface 100 may be configured to include approximately a 7 degree incline so that the lower surface 100 may also serve as at least one footrest. However, one of ordinary skill in the relevant art will understand that the lower surface 100 may be configured to provide any suitable amount of incline as needed or desired for passenger comfort.

In certain embodiments, at least one IFE control unit 102 may be stowed within the framework 92. In these embodiments, each IFE control unit 102 may be configured to also divide the framework 92 into at least two stowage compartments 94.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A passenger seat assembly comprising:
   (a) at least one seat back support;
   (b) at least one seat pan coupled to the at least one seat back support;
   (c) at least one pair of armrests coupled to the at least one seat back support, wherein at least one armrest of the at least one pair of armrests is configured to releasably couple to a tray table, each armrest of the at least one pair of armrests comprising an upper portion, the upper portion being formed by a horizontally-oriented upper section positioned above a horizontally-oriented lower section, wherein the upper section and lower section are connected and spaced apart by a vertically-oriented side, wherein an aft portion of the upper section tapers toward the side so the aft portion of the upper section does not overlap an aft portion of the lower section; and
   (d) a seat support structure comprising at least one seat pan mounting surface and a framework, wherein the at least one seat pan is coupled to the at least one seat pan mounting surface.

2. The passenger seat assembly of claim 1, wherein the framework is divided into multiple stowage compartments.

3. The passenger seat assembly of claim 1, wherein the seat support structure further comprises at least one footrest.

4. The passenger seat assembly of claim 3, wherein the at least one footrest comprises a surface inclined at approximately a 7 degree angle.

5. The passenger seat assembly of claim 1, wherein a forward portion of the lower section tapers toward the side so that a forward portion of the upper section does not overlap the forward portion of the lower section.

6. The passenger seat assembly of claim 1, further comprising an in-flight entertainment display slidingly coupled to an aft surface of the at least one seat back support.

7. The passenger seat assembly of claim 1, wherein the at least one seat back support comprises a lumbar support.

8. A passenger seat assembly comprising:
   (a) at least one seat back support;
   (b) at least one seat pan coupled to the at least one seat back support; and
   (c) at least one pair of armrests coupled to the at least one seat back support, each armrest of the at least one pair of armrests comprising an upper portion, the upper portion being formed by a horizontally-oriented upper section positioned above a horizontally-oriented lower section, wherein the upper section and lower section are connected and spaced apart by a vertically-oriented side, wherein an aft portion of the upper section tapers toward the side so the aft portion of the upper section does not overlap an aft portion of the lower section.

9. The passenger seat assembly of claim 8, wherein each armrest further comprises a lower portion spaced apart from the upper portion by a spacer.

10. The passenger seat assembly of claim 9, wherein the lower portion is configured to stow in-flight entertainment devices.

11. The passenger seat assembly of claim 8, wherein a forward portion of the lower section tapers toward the side so that a forward portion of the upper section does not overlap the forward portion of the lower section.

12. The passenger seat assembly of claim 8, further comprising an in-flight entertainment display slidingly coupled to an aft surface of the at least one seat back support.

13. The passenger seat assembly of claim 8, wherein the at least one seat back support comprises a lumbar support.

14. The passenger seat assembly of claim 1, wherein each armrest further comprises a lower portion spaced apart from the upper portion by a spacer.

15. The passenger seat assembly of claim 14, wherein the lower portion is configured to stow in-flight entertainment devices.

* * * * *